INVENTOR.
RICHARD HERZOG
BY John D. Myers
ATTORNEY

Oct. 21, 1958    R. HERZOG    2,856,753
INTERNAL-COMBUSTION TURBINE ENGINE
Filed April 19, 1955    4 Sheets-Sheet 2

INVENTOR.
RICHARD HERZOG
BY John D. Myers
ATTORNEY

Oct. 21, 1958 R. HERZOG 2,856,753
INTERNAL-COMBUSTION TURBINE ENGINE
Filed April 19, 1955 4 Sheets-Sheet 3
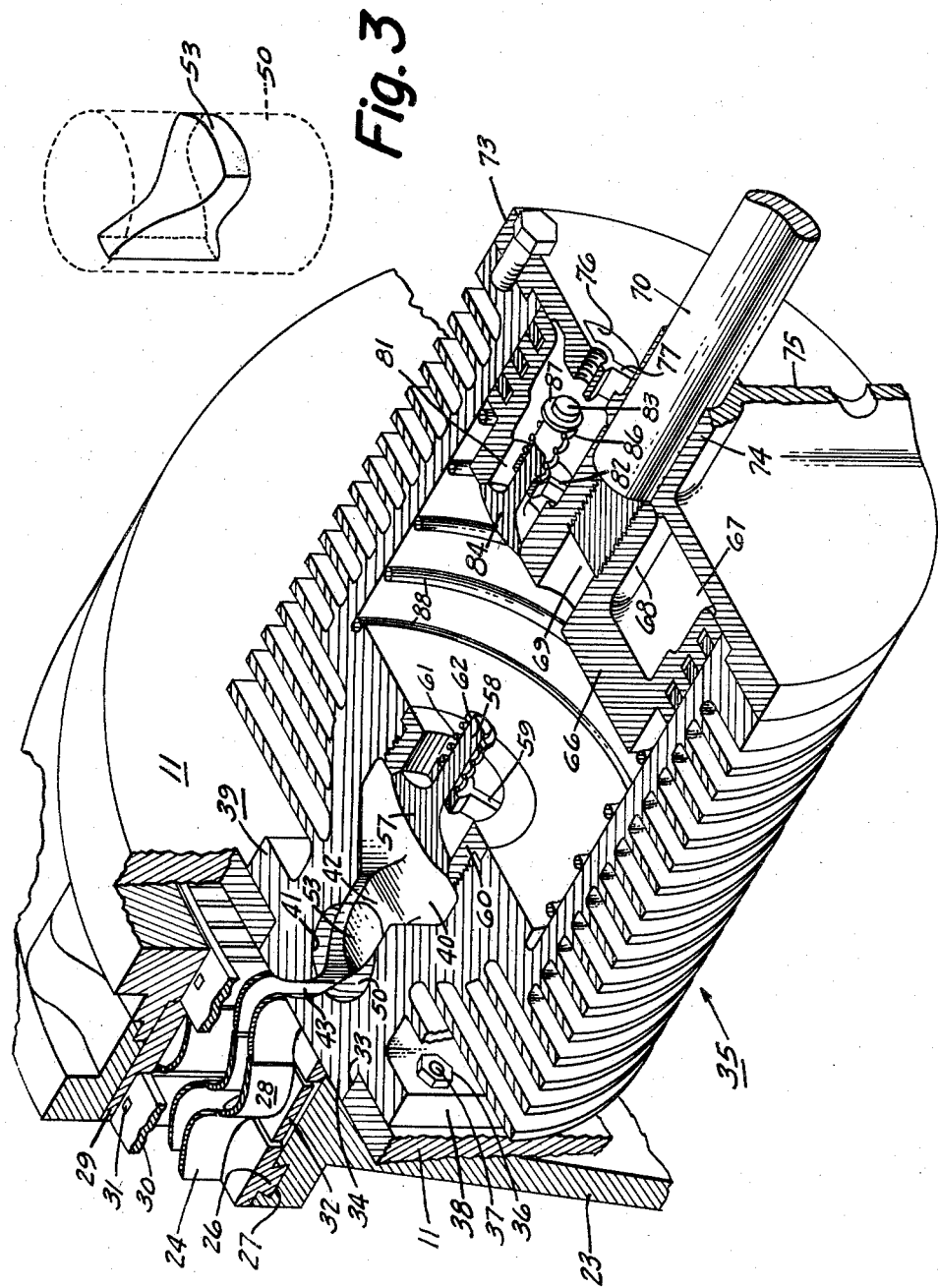
INVENTOR.
RICHARD HERZOG
BY John D. Myers
ATTORNEY Oct. 21, 1958  R. HERZOG  2,856,753
INTERNAL-COMBUSTION TURBINE ENGINE
Filed April 19, 1955  4 Sheets-Sheet 4
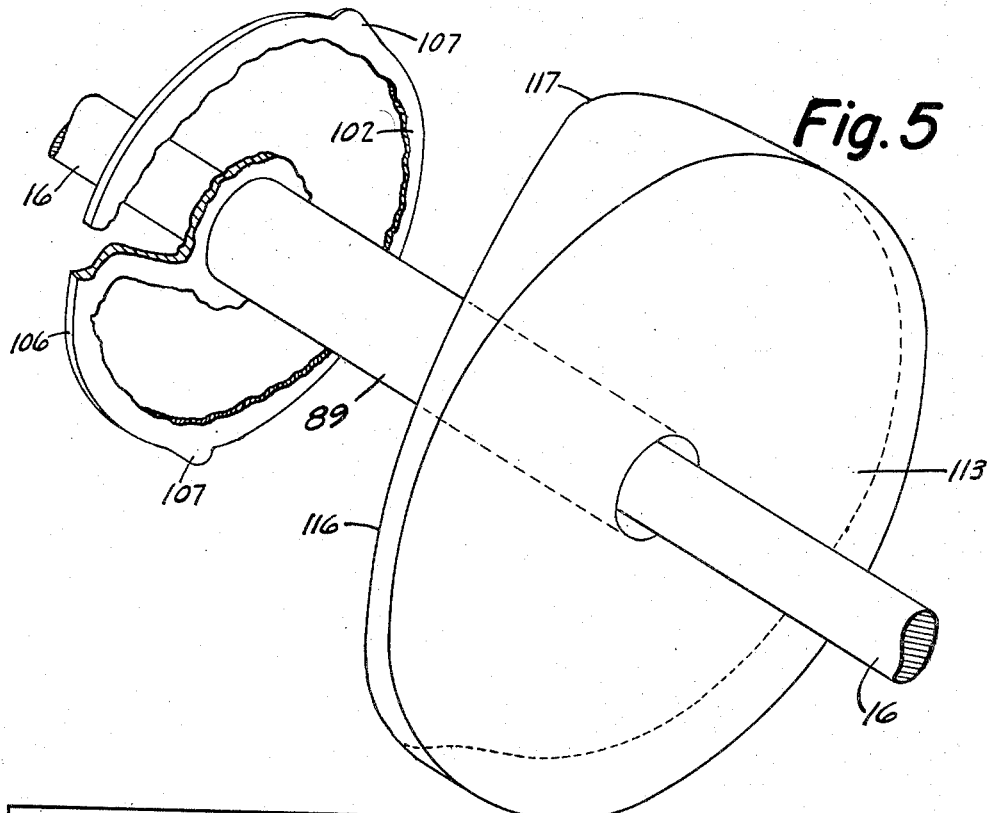
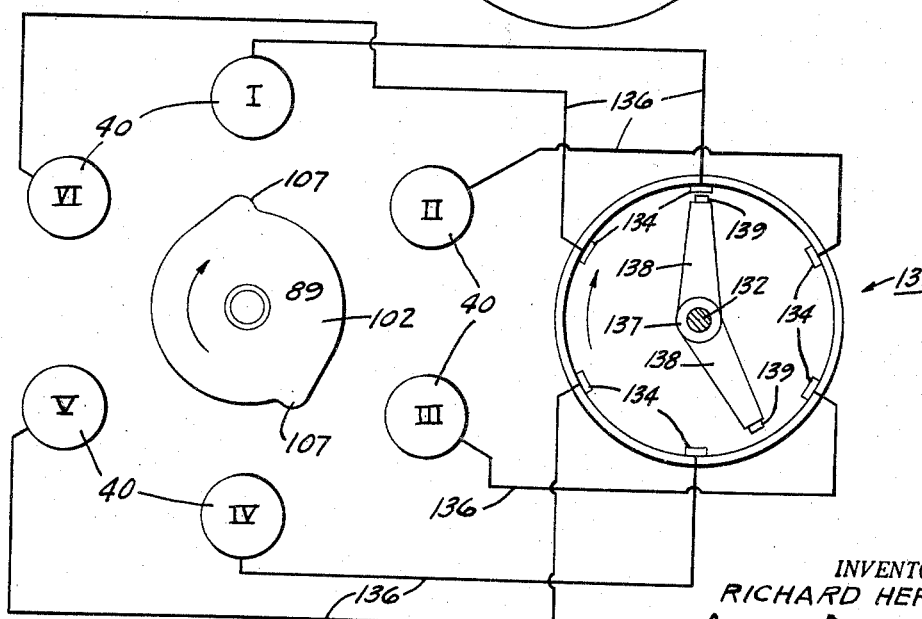
INVENTOR.
RICHARD HERZOG
BY John D. Myers
ATTORNEY

United States Patent Office 2,856,753
Patented Oct. 21, 1958

2,856,753

INTERNAL-COMBUSTION TURBINE ENGINE

Richard Herzog, Norristown, Pa.

Application April 19, 1955, Serial No. 502,390

2 Claims. (Cl. 60—39.4)

This invention relates generally to internal-combustion engines and, more particularly, to gas turbines of light construction and capable of great power and speed, rendering them practical and economical for use in automobiles, airplanes and small boats, as well as in larger installations.

One of the objects of the invention is to provide a gas turbine of compact construction having a plurality of high-compression combustion chambers provided with valved exhaust ports for the gases utilized in driving the turbine, the valves being arranged for slidable movement transversely of the exhaust ports, thereby avoiding the expenditure of energy required for moving such control valves against the pressure of the driving gases, as is common in gas turbines of the prior art.

A further object is to provide a gas turbine of the type mentioned in the foregoing object wherein the combustion chambers are formed in the heads of cylinders containing pistons for compressing the gaseous fuel mixture, and wherein a hollow shaft is provided concentrically with and driven by the main shaft of the turbine, the hollow shaft carrying relatively light-weight cam members for actuating in timed relation the fuel compression pistons and the valves for controlling the release of exhaust gases from the combustion chamber.

An additional object is to provide a gas turbine in accordance with the foregoing objects, which includes an impeller carried by the hollow shaft for directing cooling air against the cylinders, and a supercharger, including a high speed rotor carried by the main shaft for delivering a gas fuel mixture under pressure to the cylinders.

A further object is to provide a gas turbine generally of the type referred to in the foregoing objects, but wherein fuel is injected directly into the several combustion chambers and a supercharger delivers air under pressure to the several cylinders for further compression and conveyance to the combustion chambers.

Other objects, features and advantages of the invention will appear from the following description, taken in connection with the accompanying drawings illustrating a preferred embodiment of the invention in which:

Fig. 2 is a perspective view of a portion of the apparatus shown in Fig. 1, illustrating in more detail the arrangement and cooperation of certain of its parts;

Fig. 3 is a perspective view of the core or solid shape of the preferred form of aperture of an exhaust valve used in the present gas turbine, the outline of the valve member itself being shown in broken lines;

Fig. 5 is a somewhat schematic perspective view showing the relation between the lobes of the cams used in the present gas turbine;

Fig. 7 is a diagrammatic view of a distributor for the present gas turbine shown in relation to the several combustion chambers, and illustrating the operating relationship between the distributor and one of the cams of the apparatus.

Figure 1:
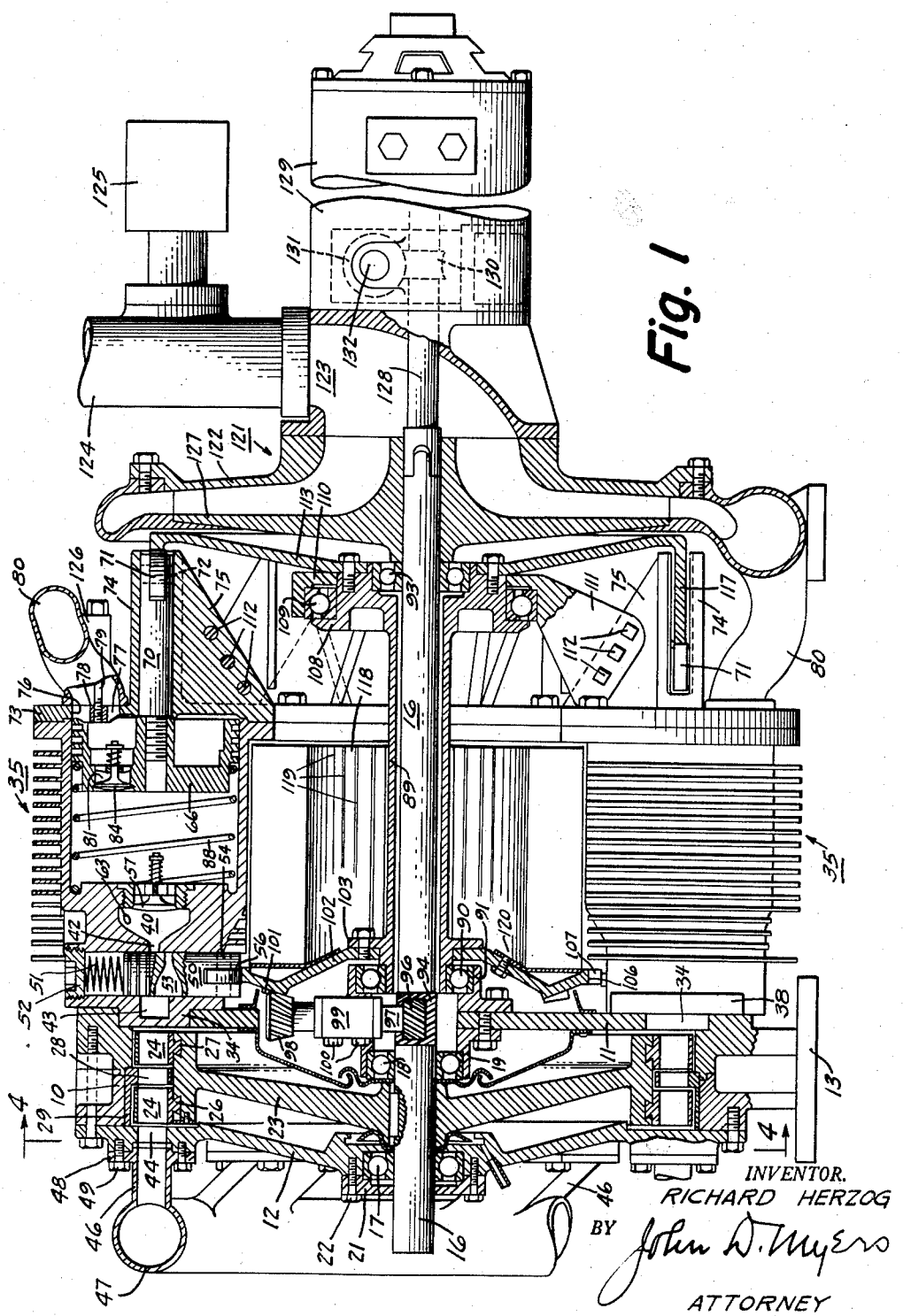
Fig. 1 is a longitudinal sectional view, partly in elevation, showing a gas turbine in accordance with the present invention.

Referring now to the drawings, and particularly to Fig. 1, the present gas turbine there illustrated includes a generally cylindrical housing 10 having an integral rear wall 11 and a removable forward wall or cover 12. A base 13 for supporting the forward end of the turbine is formed integrally with the lower portion of the housing.

The walls 11 and 12 are centrally apertured to receive a main shaft 16, the shaft being supported in a bearing 17 carried by the wall 12, and in a bearing 18 mounted in a bushing 19 secured to the wall 11. An annular closure plate 21, surrounding the shaft 16 exteriorly of the bearing 17, is secured to the wall 12 by means of cap screws 22.

Keyed to the shaft 16 within the housing 10 is a rotor 23, at the periphery of which are secured a multiplicity of spaced vanes or buckets 24 of conventional design, the vanes having integrally formed undercut tongues 26 which are slidably received in corresponding circumferential grooves or guideways 27 formed in the periphery of the rotor. As shown in Figs. 1 and 2, the vanes 24 are arranged in two sets of equal numbers, the sets being spaced axially from one another, and in the annular space between such sets of vanes are positioned a corresponding number of radially disposed stationary vanes or buckets 28 secured to a sleeve 29 fitted tightly within the housing 10. As shown in Fig. 2 a shroud band 30 snugly surrounds each of the sets of vanes 24, the band being apertured at spaced intervals throughout its entire circumference to receive lugs 31 integrally formed at the outer extremities of the vanes 24, whereby the shroud band is prevented from displacement with respect to the vanes 24. A band 32 is also secured to the inner extremities of the stationary vanes 28, and it will be seen that by the provision of the shroud bands 30 and the band 32 a confined path is provided for the gases expanding through the vanes of the rotor, minimizing the formation of eddy currents in the rotor housing. As best shown in Fig. 2, the movable vanes 24 on the rotor 23 are similarly curved in the same direction, and the stationary vanes 28 are similarly curved in the opposite direction to reverse the direction of flow of gases leaving the first set of movable vanes 24 and redirecting the expanding gases against the second set of vanes 24, in accordance with conventional practice.

The wall 11 is provided with a plurality of apertures 33 substantially equidistant from the shaft 16, and preferably equally spaced from each other angularly about the shaft, each of the apertures 33 accommodating an exterior boss 34 formed on the forward end of a cylinder 35. In the embodiment of the invention shown in the drawings, six cylinders 35 are employed, although it will be understood that more or fewer cylinders may be used, as desired. The cylinders 35, whose axes are substantially equidistant from the shaft 16 and equally spaced from each other around the shaft, are secured to the wall 11 by means of a plurality of nuts 36 threaded respectively on stud bolts 37 anchored in the wall 11 and passing loosely through flanges 38 cast externally on the cylinders at the end adjacent the boss 34. As the several cylinders 35 and their appurtenant parts are identical in construction and assembly, but one will be described.

Formed in the head 39 of the cylinder 35 are a combustion chamber 40 and, adjacent thereto, a transverse bore 41 (Figs. 2 and 4), and an interconnecting port 42 communicating with both the combustion chamber and the bore 41. The boss 34 is provided with a curved slot 43 therethrough (Fig. 2) communicating between the bore 41, opposite the exhaust port 42, and the interior of the housing 10, terminating opposite and substantially tangential to the near surface of the vanes 24 of the rotor.

In the forward wall 12 opposite each of the slots 43 is an opening 44 which also is preferably arcuate in form and has substantially the same radius of curvature as the periphery of the rotor, and positioned over the openings 44 are a corresponding member of exhaust pipe branches 46 of an exhaust manifold 47, each of the pipes 46 having an exterior flange 48 which is secured to the wall 12 around the respective opening 44 by means of cap screws 49.

Slidably positioned within the transverse bore 41 in the head of the cylinder 35 is a cylindrical valve member 50 which is biased radially inwardly (toward the shaft 16) by means of a strong compression spring 51 within the bore, the spring acting against a plug or set screw 52 threaded into the outer end of the bore 41. The valve member 50 is provided with an aperture or bore 53 which is normally out of registry with the exhaust port 42 of the combustion chamber, but which is adapted to register intermittently with the exhaust port 42 in the normal operation of the turbine to conduct the high-pressure combustion gases to the slot 43 in the boss 34, which in turn conducts the gases to the vanes 24 of the rotor. The inner end of the valve 50 carries a pivot 54 on which is rotatably mounted a roller 56 adapted to engage an operating cam, later to be described, for periodically moving the valve 50 radially outwardly in opposition to the spring 51 to bring the aperture 53 intermittently into alignment with the exhaust port 42.

Figure 4:
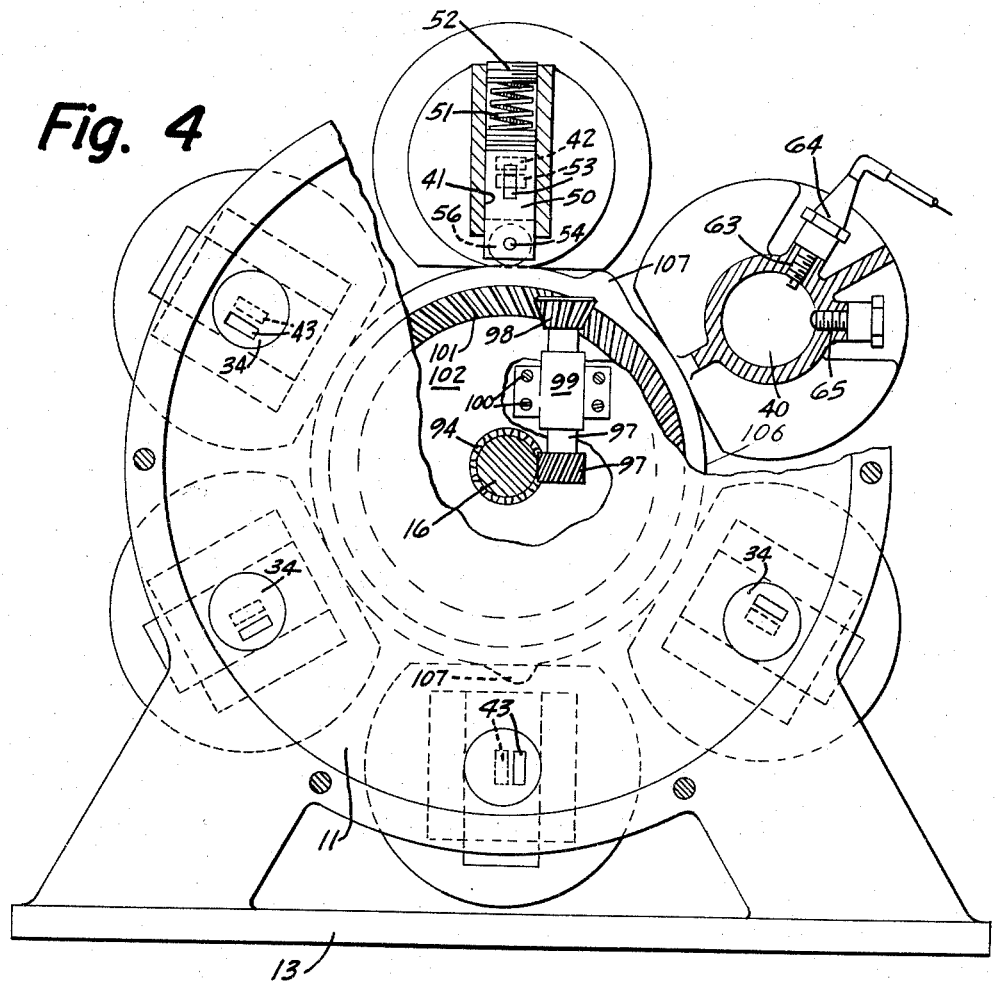
Fig. 4 is a cross-sectional view taken generally along line 4—4 of Fig. 1, looking in the direction of the arrows, some of the parts in the foreground being removed, and certain portions being broken away to show the construction and arrangement of some of the inner working parts.

As shown in Figs. 2 and 4 the exhaust port 42 is generally rectangular and oblong in transverse cross-section with its minor dimension extending radially from the shaft 16. It will also be seen from Figs. 2 and 4 that the slot 43, although curved, is also of generally rectangular and oblong transverse cross-section, and of substantially the same dimensions as those of the afore-mentioned cross-section of the exhaust port 42. However, in the case of the slot 43, it is the major dimension which extends radially from the shaft 16, in order to distribute the high-pressure exhaust gases uniformly against the vanes 24 over their entire radial dimension.

The aperture 53, therefore, is so formed that the transverse cross-sections adjacent its ends are generally rectangular and oblong, and of substantially the same dimensions as the transverse cross-sections of the port 42 and slot 43 described above. Moreover, the aperture 53, at its inlet, adjacent the port 42, has its minor dimension extending radially from the shaft 16, while at its outlet, adjacent the slot 43, its major dimension extends radially from the shaft 16. Thus, the aperture 53 will be seen to have generally rectangular and oblong form at its ends, and to be generally rectangular in cross-section throughout its length; but it is characterized by having the transverse dimension (measured in a plane perpendicular to the radial direction) progressively decrease from the inlet end of the aperture to the outlet end, while the radial (again determined with respect to shaft 16) transverse dimension progressively increases in the same direction. The resulting configuration of the aperture 53 is illustrated in solid form in Fig. 3. The advantage of an aperture of such form in the slide valve 50 is that it facilitates distribution of the driving exhaust gases uniformly against the entire radial dimension of the vanes 24, and at the same time requires only a small displacement of the valve between its completely closed and completely open positions so that, in the practical operation of the present turbine, the gaseous products of combustion escape almost instantaneously and without appreciable back pressure from the combustion chamber 40, permitting the full utilization of its energy to perform the useful work of driving the rotor.

Between the combustion chamber 40 and the interior of the cylinder 35 is a check valve 57, the stem 58 of which is slidably carried in a spider 59 mounted centrally in a threaded sleeve 60 secured in a tapped bore connecting the combustion chamber and the cylinder interior. A compression spring 61 surrounding the stem 58 between the spider and a shoulder 62 at the end of the stem urges the valve 57 normally into its closed position.

A tapped opening 63 extending through the head of the cylinder into the combustion chamber 40 is provided for receiving a spark plug 64 when the turbine is intended to be operated on a volatile fuel introduced into the cylinder 35 by means of a carbureter. However, the present turbine may also operate on low grade liquid fuel injected directly into the combustion chamber, and when this is desired, a second tapped opening 65 into the combustion chamber is provided for receiving a conventional hot wire igniter; a conventional fuel injector replaces the spark plug 64 in the opening 63 in such case.

Within the cylinder 35 is a piston 66, the rearward side of which is concave, as shown at 67, except for a rearwardly directed central boss 68. The piston 66 is provided with a central bore 69 of a diameter sufficient to accommodate the stem 58 and the spring 61 of the check valve 57 when the piston is moved in its compression stroke toward the head of the cylinder in its normal operation. The rearward end of the bore 69, which extends through the boss 68, is tapped as shown, and threadedly secured therein is a piston rod 70 having a roller 71 at its free end rotatably mounted on a pivot 72 carried by the piston rod.

The bottom, or rearward end, of the cylinder 35 is closed by a closure plate 73 from which projects perpendicularly rearwardly a split sleeve 74 for guiding the piston rod, the sleeve being supported and reinforced by webs 75 cast integrally therewith and with the closure plate 73. The closure plate 73 is apertured, as at 76, providing communication to the hollow space 67, and within the aperture 76 is mounted a spider 77 having a tapped centrally located sleeve 78 in which is threaded a bolt 79 for securing over the aperture 76 a tubular branch 80 of a supercharger to be described hereinafter.

The piston 66 is provided with a plurality of apertures 81 (only one of which is shown) in the area surrounding the central bore 69, affording communication between the spaces on both sides of the piston, and in each aperture 81 is disposed a spider 82 slidably supporting centrally of the aperture the stem 83 of a check valve 84. A weak compression spring 86 on the valve stem between the spider 82 and a shoulder or other abutment 87 at the end of the stem urges the check valve 84 into the normally closed position illustrated in Fig. 1. A compression spring 88 within the cylinder 35, between the piston 66 and the head 39 of the cylinder, urges the piston to its rearmost position, as shown in Fig. 1.

Surrounding the main shaft 16 is a concentric hollow shaft 89 which is supported at its forward end in a bearing 90 mounted in a bushing 91 secured to the wall 11, the rearward end of the hollow shaft 89 being supported by a bearing 93, the inner race of which is mounted on the shaft 16. Formed on the shaft 16 is a worm 94 which engages a worm-gear 96 fixed to one end of a shaft 97 which also carries, at its other end, a skew bevel gear 98. The shaft 97 is rotatably mounted in a bearing 99 which is fixed to the wall 11 by means of cap screws 100. The skew bevel gear 98 meshes with the skew teeth 101 of a plate gear 102 carried by the hollow shaft 89, the plate gear being secured to an annular flange 103 on the hollow shaft.

The periphery of the plate gear, outwardly of the teeth 101, is machined to provide a cam surface 106 arranged to engage the roller 56 of the slide valve 50. In the preferred form illustrated (Fig. 5), two lobes 107 are formed on the cam surface 106, whereby the valve 50 is twice displaced radially outwardly in opposition to the spring 51 for each revolution of the plate gear 102.

Since movement of the slide valve 50, as just described, releases the gases from the combustion chamber 40 for driving the turbine, and in order to assure smooth operation of the turbine which, as described, has six equally spaced cylinders (Fig. 4), I arrange the lobes 107 so that they are angularly spaced from each other by about 150°. With this arrangement, no two combustion chambers may exhaust their gases at the same time.

The rearward end of the shaft 89 is enlarged, as shown, and includes an outwardly directed radial flange 108 which abuts a thrust bearing 109 carried in an annular support 110, the latter having integral radial webs 111 which are fastened to the webs 75 by means of bolts 112. A cam drum 113 is fixed to the rearward end of the shaft 89, the cam drum having a forwardly directed cam surface 116 (Fig. 5) adapted to continuously engage the rollers 71 on the piston rods. As in the case of the plate gear 102, two lobes 117 are formed on the cam surface 116, whereby the piston 66 is twice moved forwardly in the cylinder 35 in opposition to the spring 83 for each rotation of the cam drum. The lobes 117 are arranged on the cam drum 113 in the same angular relation to one another as are the lobes 107 of the plate gear 102, and the plate gear and cam drum are preferably so arranged on the shaft 89 that the lobes 107 will lag the corresponding lobes 117 by about 30°, as graphically illustrated in Fig. 6.

An air impeller or blower 118, having blades 119, for forcing cooling air outwardly against the cylinders 35 is fixed to the plate gear 102 by means of bolts 120, and thus rotates at the same angular speed as the hollow shaft 89.

Positioned rearwardly of the cam drum 113 is a supercharger 121 having an impeller housing 122 provided with an intake opening 123 communicating with an intake manifold 124, the latter being in communication with a carburetor 125. The housing 122 communicates with the tubular branches 80 which are formed integrally with or otherwise securely attached to the housing. Each of the branches 80 is formed with an integral boss 126 having an axial opening therethrough for accommodating the bolts 79 by means of which the several tubular branches 80 are secured over the respective apertures 76. An impeller wheel 127 is keyed to the shaft 16 within the housing 122. It will be understood, of course, that when a fuel injector is used, as previously described, for injecting liquid fuel directly into the combustion chamber 40, the carburetor 125 may be omitted.

Coupled to the shaft 16, and extending rearwardly of the supercharger 121, is a shaft 128 which extends into a housing 129 fixed to the rear face of the supercharger housing 122. A conventional starting motor and generator (neither of which is shown) may be enclosed in the housing 129, together with conventional means (not shown) for coupling them to the shaft 128.

A worm 130 is preferably fixed to the shaft 128, and engages a worm-gear 131 fixed to a shaft 132 for operating a distributor 133 (Fig. 7), the speed reduction effected by means of the worm 130 and worm-gear 131 being exactly the same as that effected by the speed reducing train comprising worm 94, worm-gear 96, skew bevel gear 98 and plate gear 102, so that the firing of the several combustion chambers 40 controlled by the distributor may be perfectly timed with the position of the cam lobes 107, 117.

As shown in Fig. 7, the distributor 133, which is of conventional construction, comprises a plurality of distributor contacts 134, each of which is electrically connected by a conductor 136 to a spark plug 64 in one of the combustion chambers 40. The distributor also includes a rotor 137, which has two arms 138 provided with contacts 139, corresponding to the two lobes 107 of the plate gear 102, and similarly angularly spaced, and the rotor 137 is fixed to the shaft 132 in such a position that a spark will be delivered to each of the combustion chambers 40 at a predetermined time related to the position of the slide valve 50 as determined by the lobes 107. It will be understood, of course, that a conventional coil and condenser are also to be provided with the distributor, and are connected to conventional breaker points (not shown) for closing the electrical circuit to the distributor contacts 134, 139 whenever a pair of the lattter are in proper alignment for firing.

In operation, the turbine is started by means of a starter motor or other conventional means, which imparts initial rotation to the main shaft 16 and to the rotor 23 and impeller 127 fixed thereto. The hollow shaft 89 and the shaft 132, being connected to the shaft 16 by the speed reducing mechanisms previously described, will, of course, also rotate in response to such initial rotation of the shaft 16.

The rotating impeller 127 thus continuously draws a gaseous fuel mixture from the carburetor 125 and delivers the mixture under pressure to the various cylinders 35, through the tubular branches 80, the gas pressure being sufficient to force the fuel mixture past the check valve 84 in the piston 66. As the cam drum 113 rotates, it brings a lobe 117 into contact with the roller 71 of one of the piston rods 70, thereby moving the piston toward the head of its cylinder 35, compressing the fuel gas mixture and forcing it past the check valve 57 into the corresponding combustion chamber 40.

Figure 6:
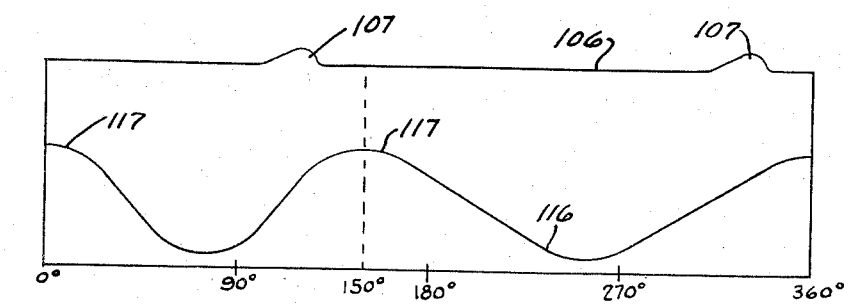
Fig. 6 is a graph illustrating the operative relation between the cams shown in Fig. 5.

As shown in Fig. 6, a lobe 107 on the plate gear 102 lags each of the lobes 117 by about 30° so that when, upon continued rotation of the hollow shaft 89, one of the lobes 117 has moved about 30° past the particular piston rod 70, a lobe 107 moves the corresponding slide valve 50 outwardly to bring its aperture 53 into alignment with the exhaust port 42 of the affected combustion chamber 40. Delivery of the igniting spark to the several combustion chambers is preferably timed, by appropriately positioning the rotor 137 of the distributor on its shaft 132, so that any given combustion chamber is fired just before the outwardly moving corresponding aperture 53 begins to come into alignment with the exhaust port 42. Immediately thereafter, the aperture 53 and port 42 having come into registry, the gaseous products of combustion pass with great force through the aperture 53 and slot 43 to the vanes 24 of the turbine to which the energy of the gases is imparted. The spent gases are conveyed by the branch pipes 46 from the rotor housing 10 to the exhaust manifold 47.

As the shaft 89 continues to turn, the lobes 107, 117 move away respectively from the rollers 56, 71 recently engaged thereby, whereby the springs 51 and 88 respectively restore the valve 50 and piston 66 to their original positions, the other set of cam lobes 107, 117 meanwhile moving into position to duplicate the foregoing operation in connection with another cylinder 35. Identifying the combustion chambers 40 in Fig. 7 by the individual numerals I, II, III, IV, V and VI, it will be seen that, in the arrangement there illustrated, the firing order is I—IV—II—V—III—VI—IV—I—V—II—VI—III. As the various cylinders fire in their turns, the speed of the rotor is quickly increased until the maximum speed is reached, which with the apparatus herein described, is about 24,000 R. P. M. The speed ratios in the described gear connections between the shaft 16 and the concentric shaft 89, and between shaft 16 and the distributor operating shaft 132, are about 24:1, and are exactly equal, so that the shafts 89 and 132 rotate at about 1,000 R. P. M., at which speed the various cams and other operating parts perform smoothly and efficiently.

It will be apparent, of course, that the speed ratios between the main shaft 16 and the shafts 89, 132, will be dependent largely upon the number of distributor contact arms 138 (and the corresponding number of each of the cams 107, 117) since the number of contact arms used determines the number of times each cylinder will be fired during each revolution of shaft 89. Consequently, as the number of contact arms 138 employed is increased, the speed ratio of shaft 16 to shaft 89 is usually correspondingly increased in order to maintain the speed of shaft 89 low enough for proper operation of the distributor and cams 107, 117.

I claim:

1. A gas turbine comprising a drive shaft, a plurality of compression cylinders arranged around said drive shaft, the axes of said cylinders being substantially equally spaced from one another and arranged equidistantly from and parallel to said drive shaft, a piston reciprocable in each of said cylinders, piston rods on said pistons, constant-volume combustion chambers associated with said cylinders, each combustion chamber having intake means adapted to admit compressed gases and to seal the gases in the chamber for combustion therein, and having an exhaust port directed parallel to said drive shaft, a rotor fixed to said drive shaft and arranged to receive the impact of gases exhausted from said exhaust ports, cylindrical slide valves located against the outside of the respective combustion chambers, each valve having an aperture therethrough and being adapted to move radially of said shaft to bring said apertures into alignment with said ports, whereby the exhaust gases are directed therethrough from the ports to the rotor, and alternately out of alignment with said ports, whereby the gases are prevented from exhausting therefrom, a hollow shaft positioned coaxially about said drive shaft and rotatable relatively thereto, speed reducing mechanism connecting said shafts, a cam member operatively connected to said hollow shaft and having a radially directed cam surface engaging said valves to move the latter respectively transversely of said ports, and a second cam member operatively connected to said hollow shaft and having a cam surface directed parallel to said drive shaft, said last mentioned cam surface engaging said piston rods whereby the pistons are actuated in said cylinders upon rotation of said hollow shaft.

2. A gas turbine comprising a compression cylinder having a piston reciprocable therein, a pistonless combustion chamber communicable with the interior of said cylinder ahead of said piston through a valved opening permitting passage of compressed gases only from said cylinder to said chamber, means for biasing said piston away from said opening, a conduit for introducing gas to said cylinder on the other side of said piston, a check valve in said piston permitting passage of gas therethrough only toward said one side of said piston, said combustion chamber having an exhaust port, a rotor arranged to receive the impact of gases exhausted from said exhaust port, a shaft for said rotor, a hollow second shaft positioned coaxially about said first mentioned shaft, speed reducing mechanism operatively connecting said shafts, an exhaust valve having an aperture therethrough and adapted to slide transversely of said port adjacent the outlet thereof to bring said aperture into and out of alignment with said port, means for urging said exhaust valve to maintain said aperture normally out of alignment with said port, cam means operatively connected with said hollow shaft for moving said piston in opposition to said biasing means, and a second cam means operatively connected with said hollow shaft for moving said exhaust valve in opposition to said urging means to bring said aperture into alignment with said exhaust port.

References Cited in the file of this patent

UNITED STATES PATENTS

| | | |
|---|---|---|
| 1,006,907 | Büchi | Oct. 24, 1911 |
| 1,343,473 | Pflaume | June 15, 1920 |
| 1,421,632 | Wedig | July 4, 1922 |
| 1,961,905 | Michell | June 5, 1934 |
| 1,991,717 | Wondra | Feb. 19, 1935 |
| 2,386,497 | Orloff | Oct. 9, 1945 |

FOREIGN PATENTS

| | | |
|---|---|---|
| 142,959 | Great Britain | May 20, 1920 |
| 61,652 | Norway | Oct. 30, 1939 |

UNITED STATES PATENT OFFICE
CERTIFICATE OF CORRECTION

Patent No. 2,856,753                      October 21, 1958

Richard Herzog

It is hereby certified that error appears in the printed specification of the above numbered patent requiring correction and that the said Letters Patent should read as corrected below.

Column 2, line 29, for "Figs" read -- Figs. --; column 3, line 15, for "member" read -- number --; line 45, for "afore-mentioned" read -- aforementioned --.

Signed and sealed this 13th day of January 1959.

(SEAL)
Attest:
KARL H. AXLINE
Attesting Officer

ROBERT C. WATSON
                                          Commissioner of Patents